United States Patent [19]

Lemoine

[11] Patent Number: 4,985,315

[45] Date of Patent: Jan. 15, 1991

[54] MATERIAL FOR THE CONDUCTION OF PROTONS AND METHOD OF MAKING THE SAME

[75] Inventor: Joseph Lemoine, Friedrichshafen, Fed. Rep. of Germany

[73] Assignee: MTU Friedrichshafen GmbH, Friedrichshafen, Fed. Rep. of Germany

[21] Appl. No.: 432,378

[22] Filed: Nov. 6, 1989

[30] Foreign Application Priority Data

Nov. 8, 1988 [DE] Fed. Rep. of Germany ....... 3837814

[51] Int. Cl.$^5$ ............................................ H01M 10/39
[52] U.S. Cl. ...................... 429/33; 429/191; 501/73; 427/115; 252/622
[58] Field of Search ..................... 429/33, 191; 501/73; 427/115; 252/62.2

[56] References Cited

U.S. PATENT DOCUMENTS 4,024,036 5/1977 Nakamura et al. ............... 429/33 X
4,197,365 4/1980 Farrington ......................... 429/193

FOREIGN PATENT DOCUMENTS 2750305 5/1979 Fed. Rep. of Germany .
3515742 11/1986 Fed. Rep. of Germany .

Primary Examiner—Stephen J. Kalafut
Attorney, Agent, or Firm—Barnes & Thornburg

[57] ABSTRACT

An amorphous material for the conduction of protons on a base of potassium hydrodisilicate contains oxometallates, bi- and trivalent metal ions and an excess of silicon dioxide and is suitable for use in fuel cells.

23 Claims, No Drawings

MATERIAL FOR THE CONDUCTION OF PROTONS AND METHOD OF MAKING THE SAME

BACKGROUND AND SUMMARY OF THE INVENTION

The present invention generally relates to a material with an amorphous structure on a base of potassium hydrodisilicate, and more particularly, to such a material which is a proton conductor adapted for use in fuel cells and a process for making the same.

To the extent that such materials exist as glasses, they become electrolytically conductive at temperatures near their softening point so that, when an electric field is applied, metal and hydrogen ions migrate through the material. Disadvantages of such electrolytically conductive glasses include high operating temperatures, dimensional instability, changes of material connected with the current conduction as a result of metal ion migration and formation of electronically conductive areas by metal precipitations.

Crystalline materials for the exclusive conduction of Protons are disclosed by the text "Proton Conduction and Injection Solids, Chemical Reviews, 1975, No. 1, Page 21 to 65". However, for technical applications, such as fuel cells, their proton conducting capacity of $10^{-15}$ to $10^{-4}$ S cm$^{-1}$ (compare Page 24, Chem. Rev., 1975, No. 1) is too low. Other disadvantages are the high operating temperatures and the crystalline structure as well as the resulting anisotropy of the proton conducting capacity.

An object of the present invention is to provide a material which represents a suitable proton conductor for fuel cells and which has an anisotropic proton conducting capacity of more than about $10^{-4}$ S$\times$cm$^{-1}$, and to provide a process for producing such a material.

This object and other objects are achieved according to advantageous embodiments of the material in that, in addition to potassium hydrodisilicate, the material contains oxometallates up to a molar ratio of about 1:5, and in that doping elements of the third group of the Periodic Table up to about 50 mol. % are incorporated instead of 100 mol. % silicon ions, and in that up to about 50 mol. % of the potassium ions are replaced by bivalent metal ions of approximately the same ionic radius, and in that up to about 400 mol. % or four times the original 100 mol. % of silicon dioxide are contained.

This material has advantages which include that, except for the proton conduction, it suppresses other ion conductions, that its electronic conducting capacity is negligibly low, and that it blocks off electrons in the area close to the surface.

The material according to advantageous embodiments of the present invention is based on potassium hydrodisilicate, since potassium hydrodisilicate is capable of forming a glass having a chain type molecular structure, and since it tends to form hydrogen bridges The silicate chains are doped with elements of the third group of the periodic system up to about 50 mol. %, preferably from about 2 mol. % to about 30 mol. %, instead of the silicon ions, so that hydrogen vacancies are formed during the formation of hydrogen bridges By increasing the hydrogen vacancies, the vacancy diffusion of hydrogen ions is improved and thus the proton conducting capacity is increased advantageously.

In a particularly advantageous embodiment of the invention, aluminum ions, as a doping element, are incorporated up to about 15 mol. % of the silicon ions, these aluminum ions forming a water inhibiting layer, while, within the volume, they increase the proton conducting capacity of the material.

In another preferred embodiment of the invention, boron ions, as a doping element, are incorporated which advantageously do not form any crystalline precipitations even at a high concentration and, at the same time, advantageously reduce the operating temperature.

An essential characteristic is the addition of oxometallates up to a molar ratio of about 1:5, preferably of about 1:1 to about 1:3 between the potassium hydrodisilicate and the oxometallates which advantageously improves the proton conducting capacity of the material since highly polarizable covalently bonded anionic polymer chains are incorporated into the amorphous structure together with the doped silicate chains.

Preferably, oxometallates of the transition metals are used since they cause an increase of the proton conducting capacity by more than a power of ten. From this group, titanates, vanadates, chromates, zirconates, niobates, molybdates, hafnates, tantalates and wolframates proved to be particularly suitable.

When the material, according to advantageous embodiments of the invention, is used in a water containing or water vapor containing environment, as it exists, for example, in fuel cells, the insolubility of the material in water is decisive. In order to increase the waterproof characteristic of the material, up to about 50 mol. %, preferably from about 5 mol. % to 20 mol. % of the potassium ions are replaced by bivalent metal ions of approximately the same ionic radius.

Preferably, barium ions are used instead of potassium ions for from about 5 to about 20 mol. % of the potassium ions, since barium ions represent a particularly good protection against the penetration of water molecules and the decomposition of the material by water molecules.

In order not to lose any water molecules which are required for the forming of hydrogen bridges during the process of glass formation, an increased pressure of from about 20 to 400 bar, preferably about 70 to 300 bar, is applied during the glass formation at temperatures between about 500° and about 800° C., preferably between about 550° and about 700° C.

The advantages of such waterproof, proton conducting glasses include the special characteristic that an electronic conduction is prevented at the surface as well as in the volume of the glasses, so that a low volume fuel cell can be implemented which is based on a high proton conduction. For this purpose, the proton conductive glass according to the invention is applied preferably to a supporting substrate as an amorphous film having a thickness of about 5 to 150 μm by means of a special preparation process.

In a preferred embodiment, this amorphous film reaches a proton conducting capacity of at least about $10^{-2}$ S cm$^{-1}$ at a operating temperature of about 200° C.

The process according to further advantageous embodiments of the present invention has the advantage that a glass forming suspension is converted directly on a substrate into a proton conducting glass layer at temperatures of about 500° to about 800° C. and pressures of about 20 to about 400 bar, preferably at temperatures between about 550° and 700° C. and at a pressure of about 70 to about 300 bar, so that the geometrically advantageous form of a proton conducting glass plate is obtained without any cutting, separating techniques and grinding or polishing work.

If the substrate, in a preferred embodiment, forms a porous electrode material of a fuel cell, which preferably is a platinized sintered metal plate on a base of, for example, copper, it may advantageously, without any intermediate treatment, be used with the proton conducting glass layer according to the invention as an active partition in fuel cells.

If the substrate is unsuitable for use as an electrode material, the substrate, in another advantageous embodiment, is removed from the glass layer, for example, by paring, stripping, separating or by caustics. At the softening point of the glass, the resulting self contained glass layer, on both sides or on one side, is pressed together with single layer or multi-layer electrode material for fuel cells, as, for example, of a layer of platinized sintered copper and another layer of sintered platinum.

This pressing together is advantageously carried out in a heatable high pressure facility in a water vapor atmosphere so that the proton conducting capacity of the glass layer is maintained.

Other objects, advantages and novel features of the present invention will become apparent from the following detailed description of the invention when considered in conjunction with the accompanying drawings.

DETAILED DESCRIPTION OF PREFERRED EMBODIMENTS OF THE INVENTION

The following embodiments have the purpose of explaining the present invention in detail and indicating an advantageous composition of the material as well as a process for producing a proton-conducting material according to the invention.

A material for the conduction of protons on a base of potassium hydrodisilicate is composed of the following constituents:
about 22.4 mol. % potassium hydrodisilicate
about 32.2 mol. % dipotassium dititanate
about 32.2 mol. % silicon dioxide
about 3.6 mol. % aluminum oxide
about 9.6 mol.% barium oxide.

For producing a material for the conduction of protons, a suspension is, for example, first made consisting of a potassium silicate solution with the following molar parts of finely pulverized oxides and hydroxides per approximately 100 liters of water:
about 86.8 mols potassium hydroxide
about 77.2 mols silicon dioxide
about 64.4 mols titanium dioxide
about 3.6 mols aluminum oxide
about 9.6 mols barium hydroxide Then the suspension is applied to a metallic substrate. Subsequently, the coated substrate is heated to about 600° C. in a heatable high pressure facility and, in water vapor, is acted upon by a pressure of about 120 bar.

After the formation of the glass, the metallic substrate is removed by caustics, and a self supporting proton conducting glass layer of a thickness of approximately 100 μm is applied to a porous electrode material for fuel cells and is heated in a heatable high pressure facility to the softening point of the glass layer under a pressure of about 300 bar in a water vapor atmosphere. After the proton conducting material is removed from the high pressure facility, the material exhibits a proton conducting capacity of about $2 \cdot 10^{-2}$ S cm$^{-1}$ to about $3 \cdot 10^{-2}$ S cm$^{-1}$.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A material of an amorphous structure on a base of potassium hydrodisilicate, wherein, in addition to the potassium hydrodisilicate, the material contains oxometallates up to a molar ratio of about 1:5 potassium hydrodisilicate to oxometallates, and wherein doping elements of the third group of the Periodic Table up to about 50 mol. % are incorporated instead of 100 mol. % silicon ions, and up to about 50 mol. % of potassium ions are replaced by bivalent metal ions of approximately a same ionic radius as the potassium ions, and additionally silicon dioxide is contained, on a molar basis, up to four times the combined amount of said silicon ions and said doping elements.

2. A material according to claim 1, wherein metal ions of the oxometallates are transition metals.

3. A material according to claim 2, wherein the transition metals are at least one of titanates, vanadates, chromates, zirconates, niobates, molybdates, hafnates, tantalates and wolframates.

4. A material according to claim 1, wherein the doping element is aluminum and replaces up to about 15 mol. % of the silicon ions.

5. A material according to claim 2, wherein the doping element is aluminum and replaces up to about 15 mol. % of the silicon ions.

6. A material according to claim 1, wherein the doping element is boron and replaces up to about 50 mol. % of the silicon ions.

7. A material according to claim 2, wherein the doping element is boron and replaces up to about 50 mol. % of the silicon ions.

8. A material according to claim 1, wherein, as a replacement for the potassium ions, barium ions are incorporated into the amorphous structure.

9. A material according to claim 1, wherein the molar ratio between potassium hydrodisilicate, oxometallates, doping elements, bivalent metal ions and silicon dioxide is adjusted within the given limits in such a manner that the material has a proton conducting capacity of over about $10^{-2}$ S cm$^{-1}$ at an operating temperature of about 200° C.

10. A process for producing a proton conducting material of an amorphous structure on a substrate comprising the steps of:

(a) preparing a suspension made of a potassium silicate solution and a finely distributed powder having a composition relative to about one mol of potassium hydrodisilicate of about 0 to 5 mols of one of oxometallate and oxometallate forming agents, about 0 to 0.5 mols of a trivalent metal ion in one of an oxidic bond and as an anion of a salt with approximately a same ionic radius as a silicon ion, about 0 to 0.5 mols of a bivalent metal ion as one of an oxide, hydroxide and anion of a salt with an approximately identical ionic radius as a potassium ion; and about 0 to 4 mols silicon dioxide, in which case a lower limit with two constituents can be 0;

(b) applying the suspension to a substrate;

(c) heating the suspension and the substrate under high pressure to temperatures between about 500° and about 800° C. at a pressure of from about 20 to about 400 bar to form a proton conducting glass layer with a substrate.

11. A process according to claim 10, wherein the heating step takes place in a water vapor containing atmosphere.

12. A process according to claim 10, wherein the substrate is formed as a porous electrode material of a fuel cell.

13. A process according to claim 10, wherein after the heating step, the substrate is removed from the proton conducting glass layer.

14. A process according to claim 13, further comprising the step of pressing the glass layer together on one side with a porous electrode material for fuel cells at a softening temperature of the glass layer.

15. A process according to claim 14, wherein the glass layer, in several layers, is pressed together with the electrode material for fuel cells.

16. A process according to claim 13, wherein the glass layer is pressed together, on both sides, with an electrode material for fuel cells.

17. A process for producing a material of an amphorous structure on a substrate comprising the steps of:

(a) preparing a suspension made of a potassium silicate solution and finely distributed powder having a composition relative to about one mol of potassium hydrodisilicate of about 1 to about 3 mols of one of oxometallate and oxometallate forming agents, about 0.02 to about 0.3 mols of a trivalent metal ion in one of an oxidic bond and as an anion of a salt with approximately a same ionic radius as a silicon ion, about 0.05 to about 0.2 mols of a bivalent metal ion as one of an oxide, hydroxide and anion of a salt with an approximately identical ionic radius as a potassium ion; and about 1 to about 3 mols silicon dioxide;

(b) applying the suspension to a substrate;

(c) heating the suspension and the substrate under high pressure to temperatures between about 550° and about 700° C. at a pressure of about 70 to about 300 bar to form a proton conducting glass layer with a substrate.

18. A process according to claim 17, wherein the heating step takes place in a water vapor containing atmosphere.

19. A process according to claim 17, wherein the substrate is a porous electrode material of a fuel cell.

20. A process according to claim 17, wherein after the heating step, the substrate is removed from the glass layer.

21. A process according to claim 20, wherein the glass layer is pressed together on one side with a porous electrode material for fuel cells at a softening temperature of the glass layer.

22. A process according to claim 21, wherein the glass layer, in several layers, is pressed together with the electrode material for fuel cells.

23. A process according to claim 20, wherein the glass layer is pressed together, on both sides, with electrode material for fuel cells.

* * * * *